Figure 1:
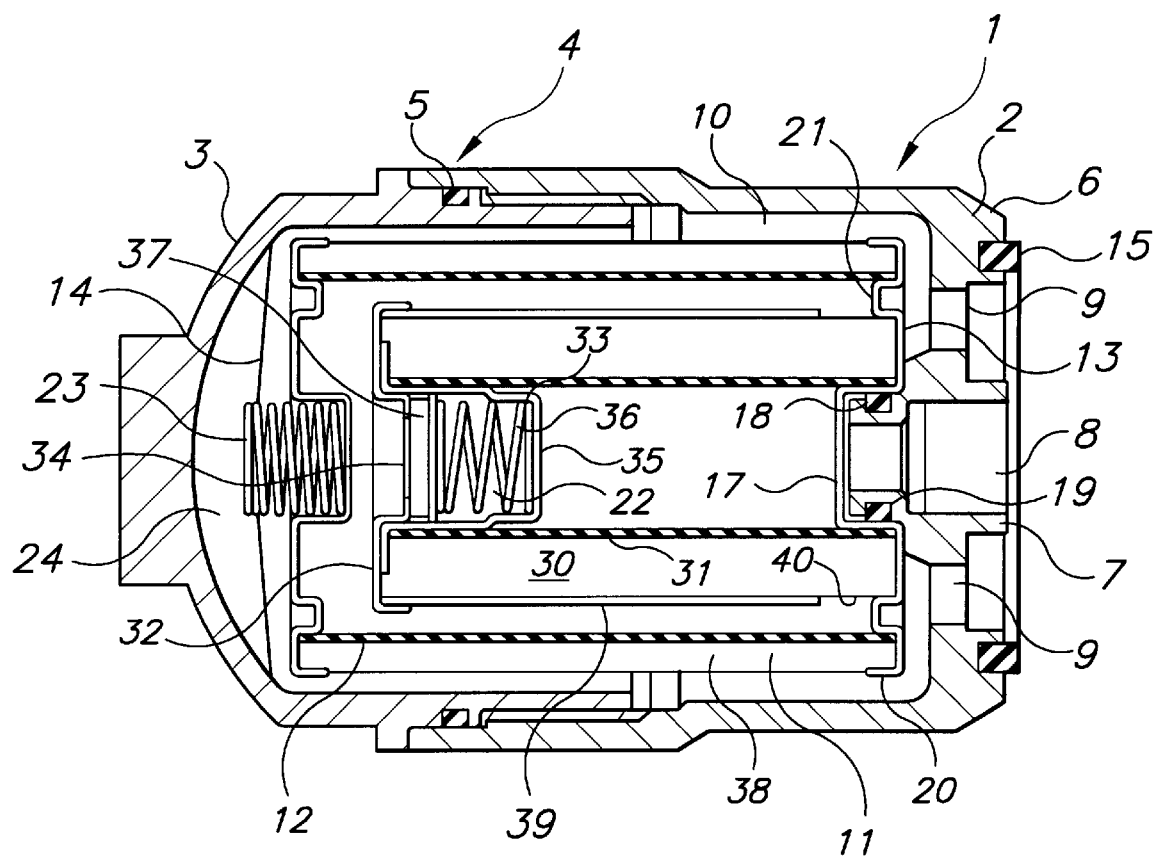

United States Patent
Cox

[11] Patent Number: 5,888,383
[45] Date of Patent: Mar. 30, 1999

[54] FLUID FILTER ARRANGEMENT WITH BYPASS AND SHIELD FOR SMALL PORE SIZE SCREEN

[75] Inventor: Ian M Cox, Yeovil, England

[73] Assignee: The Glacier Metal Company Limited, Great Britain

[21] Appl. No.: 817,506

[22] PCT Filed: Nov. 23, 1995

[86] PCT No.: PCT/GB95/02725

§ 371 Date: Apr. 17, 1997

§ 102(e) Date: Apr. 17, 1997

[87] PCT Pub. No.: WO96/16716

PCT Pub. Date: Jun. 6, 1996

[30] Foreign Application Priority Data

Nov. 25, 1994 [GB] United Kingdom ............... 9423823

[51] Int. Cl.[6] .................... B01D 35/14; B01D 35/143
[52] U.S. Cl. .......................... 210/130; 55/323; 210/136; 210/168; 210/184; 210/338; 210/443; 210/456
[58] Field of Search ................. 210/130, 132, 210/133, 136, 168, 171, 175, 184, 259, 314, 315, 337, 338, 360.1, 433.1, 434, 440, 443, 483, 484, 493.1, 488, 489, 498; 123/196 A; 55/323, 487

[56] References Cited

U.S. PATENT DOCUMENTS

| | | | |
|---|---|---|---|
| 3,000,505 | 9/1961 | Scavuzzo | 210/132 |
| 3,262,564 | 7/1966 | Pall et al. | 210/132 |
| 3,270,884 | 9/1966 | Bremer | 210/132 |
| 3,390,774 | 7/1968 | Neely | 210/315 |
| 3,390,780 | 7/1968 | Bennett | 210/338 |
| 3,933,638 | 1/1976 | Isley | 210/168 |
| 4,885,082 | 12/1989 | Cantoni | 210/132 |
| 5,160,037 | 11/1992 | LeCour | 210/132 |
| 5,458,767 | 10/1995 | Stone | 210/130 |

FOREIGN PATENT DOCUMENTS

| | | |
|---|---|---|
| 2434075 A1 | 7/1974 | Germany . |
| 3446772 A1 | 7/1986 | Germany . |
| 3641331 C1 | 12/1986 | Germany . |
| 965328 | 7/1964 | United Kingdom . |
| 2 141 354 | 12/1984 | United Kingdom . |
| WO 90/12635 | 11/1990 | WIPO . |

*Primary Examiner*—Joseph W. Drodge
*Attorney, Agent, or Firm*—Nixon & Vanderhye P.C.

[57] ABSTRACT

A full-flow fluid filter assembly is provided including a large pore size screen disposed in series with a relatively smaller pore size screen, together with a device responsive to obstruction of the smaller pore size screen to cause substantially all of the fluid flow to pass only through the large pore size screen. The arrangement is such that during use the fluid passes through both screens and, during bypassing of the smaller pore size screen, passes through at least the larger pore size screen. The device may be a one-way valve adapted to respond to increased back pressure developed across the small pore size screen. Preferably, the small pore size screen is provided with a shield or baffle adapted to minimize direct impingement of the fluid flow on the small pore size screen with the result of entrainment of debris from the small pore size screen during bypassing of this screen.

8 Claims, 4 Drawing Sheets

FLUID FILTER ARRANGEMENT WITH BYPASS AND SHIELD FOR SMALL PORE SIZE SCREEN

This application is a 371 of International Application No. PCT/GB95/02725, filed on Nov. 23, 1995.

This invention relates to fluid filters particularly, but not exclusively for use with internal combustion engines. The use of meshes and/or screens for removal of debris from a fluid stream such as re-circulating engine oil is known. Both metallic and non-metallic filter materials are used; the filter elements may be cleanable or disposable. It is usual to pass all of a fluid stream through the filter arrangement; this is a "full flow" filtration system.

Debris in a lubricating oil system takes several forms. There is particulate mechanical debris present in a new engine in the form of metal particles which are flushed from the oilways when the engine is first started. There is also fine debris such as combustion by-products and dust which progressively contaminate the oil as the engine runs. The former debris is potentially very damaging, the latter needs to be controlled to prevent build-up inside the engine and a particularly effective way of addressing this is to utilise a centrifugal cleaner in conjunction with a conventional "full flow" static filter. The usual arrangement is for about 5–10 percent of the total oil flow to pass through the centrifugal cleaner whilst the rest passes through the static filter, in the usual full flow configuration. The centrifugal cleaner is extremely efficient in removing fine debris, particularly combustion by-products.

The use of both disposable and cleanable filter elements in such a full-flow system is very old. However, the choice of filter pore size is important since the use of too small a pore size will rapidly result in clogging by fine contaminant particles, leading to an increase in back pressure and eventual failure. Too large a pore size will leave fine contaminants unaffected. In practice, the use of a single small pore size disposable filter element for both coarse and fine contaminants has become the norm, but such elements inevitably require periodic replacement or cleaning. But in automotive lubricating oil systems, it is known that the majority of the damage due to particulate mechanical debris occurs very early in the life of the engine.

It has been proposed to use a static full flow filter with two filter elements of different pore sizes disposed in series, together with valve means operable to by-pass the filter if it becomes excessively obstructed. Such an arrangement is disclosed in U.S. Pat. No. 4,885,082. However, in the event of obstruction, the whole filter is by-passed except for a small proportion of the flow. Inevitably, this results in the majority of the flow being completely unfiltered in the event that the by-pass valve means operates.

It is an object of the present invention to provide a simplified construction which avoids this disadvantage.

The present invention provides a full-flow fluid filter assembly characterised by the inclusion of a large pore size screen and a small pore size screen which in use are disposed in series with one another and with the fluid flow, together with means responsive to obstruction of the small pore size screen to cause substantially all of the fluid flow to pass only through the large pore size screen the arrangement being such that, in use, all of the flow passes through at least one screen. The means responsive to obstruction of the small pore size screen may be a one-way valve adapted to respond to increased back pressure developed across the small pore size screen. When the back pressure reaches a pre-chosen level corresponding to an unacceptable level of small pore size screen obstruction, which may in turn correspond to an unacceptable reduction in fluid flow, the valve opens to by-pass the small pore size screen. A spring loaded one-way valve is particularly preferred. Thus in the filter assembly of this invention, there is always at least one filtering element in operation, even when the valve means operates to by-pass the small pore size screen.

In the present context and for the purposes of the rest of this specification "pore size" refers to the filtration capability in respect of particulate material. "Large" for present purposes means a pore size in the range 50 to 100 $\mu$m typically 70 $\mu$m. "Small" means a pore size in the range 10 to 40 $\mu$m typically less than 30 $\mu$m.

However, these values may vary substantially according to the particular and use/application.

The use of a one-way valve also serves to minimise the effects of a sudden pressure surge which might otherwise result in a temporary reduction of fluid flow. In this event, the surge will cause a brief increase in back pressure thereby causing the valve to open and allow fluid to temporarily by-pass the small pore size screen. This is especially valuable on start-up of an internal combustion engine where temporary oil starvation might have serious consequences such as a bearing seizure. However, the effect of the valve opening even briefly requires consideration since there will inevitably be some risk of fine contaminant material being flushed from the fine pore size screen into the flow through the coarse size screen. According to a particularly preferred embodiment of the invention, the fine pore size screen is provided with a shield or baffle adapted to minimise direct impingement of the fluid flow onto the fine pore size screen when the one-way valve operates to by-pass the latter.

Preferably the screen assembly of this invention is located in a singe housing provided with inlet and outlet ports enabling the assembly to be connected into a fluid flow circuit. The inlet and outlet ports are conveniently located at the same end of the housing.

Conveniently the screens are disposed in a coaxial arrangement which includes the shield or baffle, the latter being disposed adjacent the fine pore size screen, as will be later described with reference to the accompanying drawings. To augment the action of the shield or baffle in containing fine debris when the by-pass valve opens or is open, at least part of the shield or baffle may be made of a thermally responsive material which undergoes plastic deformation when heated.

In this way, it is possible to use the filter assembly to trap fine debris present in a typical, new internal combustion engine oil system and then as the oil warms up due to operation of the engine and when the fine debris occlude the small pore size screen to the point where the by-pass valve opens, the shield or baffle material will shrink to trap the debris on the small pore size screen so it cannot be flushed into the large pore size screen and through the latter back into the system. It will be appreciated that this is a one-off operation; all further filtration is taken care of by the large pore size screen in this embodiment of the invention. For this reason, the use of the filter assembly of this invention in conjunction with a centrifugal cleaner is especially preferred, because the latter is very effective in removing fine debris.

It will be appreciated that a fluid filter assembly according to the present invention requires minimal maintenance. In automotive use only the small pore size screen is likely to become occluded and this can be left for a considerable period before cleaning or replacement is need. Most of the fine, potentially damaging debris will be very quickly removed from the oil when the engine is first run. Thereafter, the large pore size screen and conventional filtration will take care of further debris.

Figure 2:
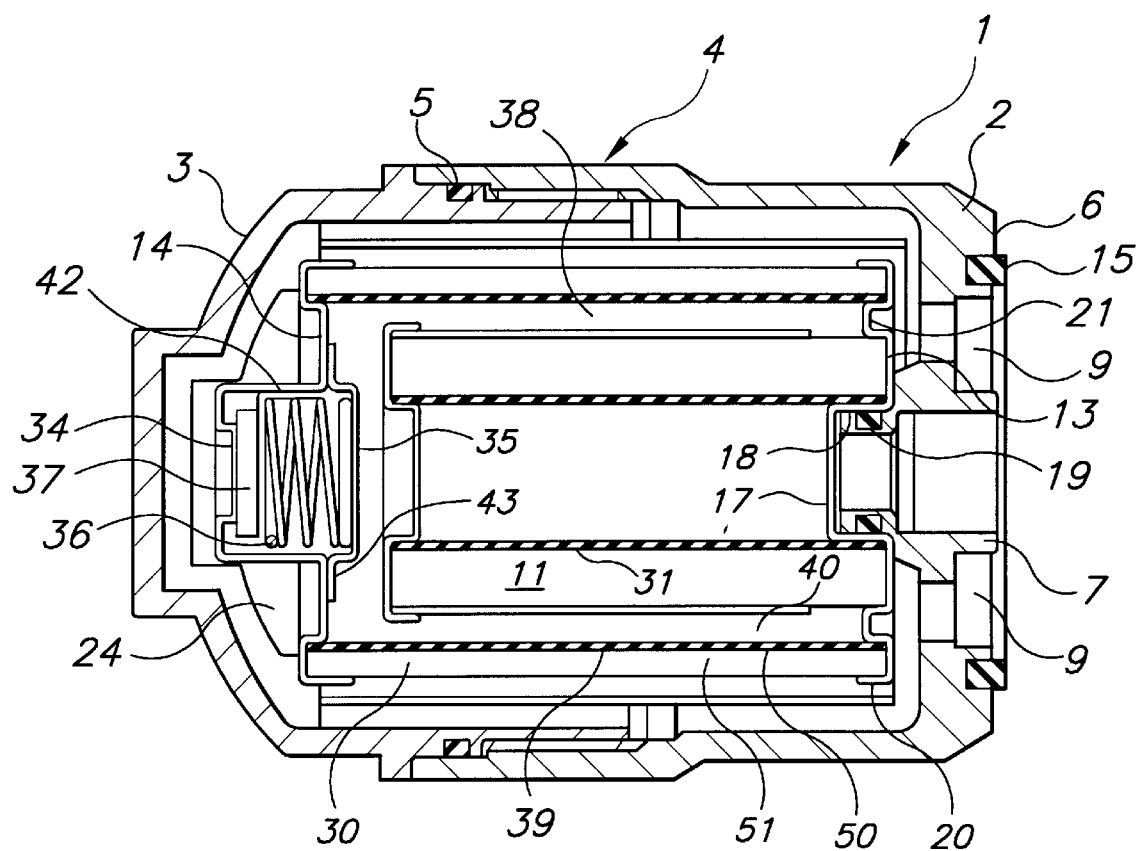
Figure 3:
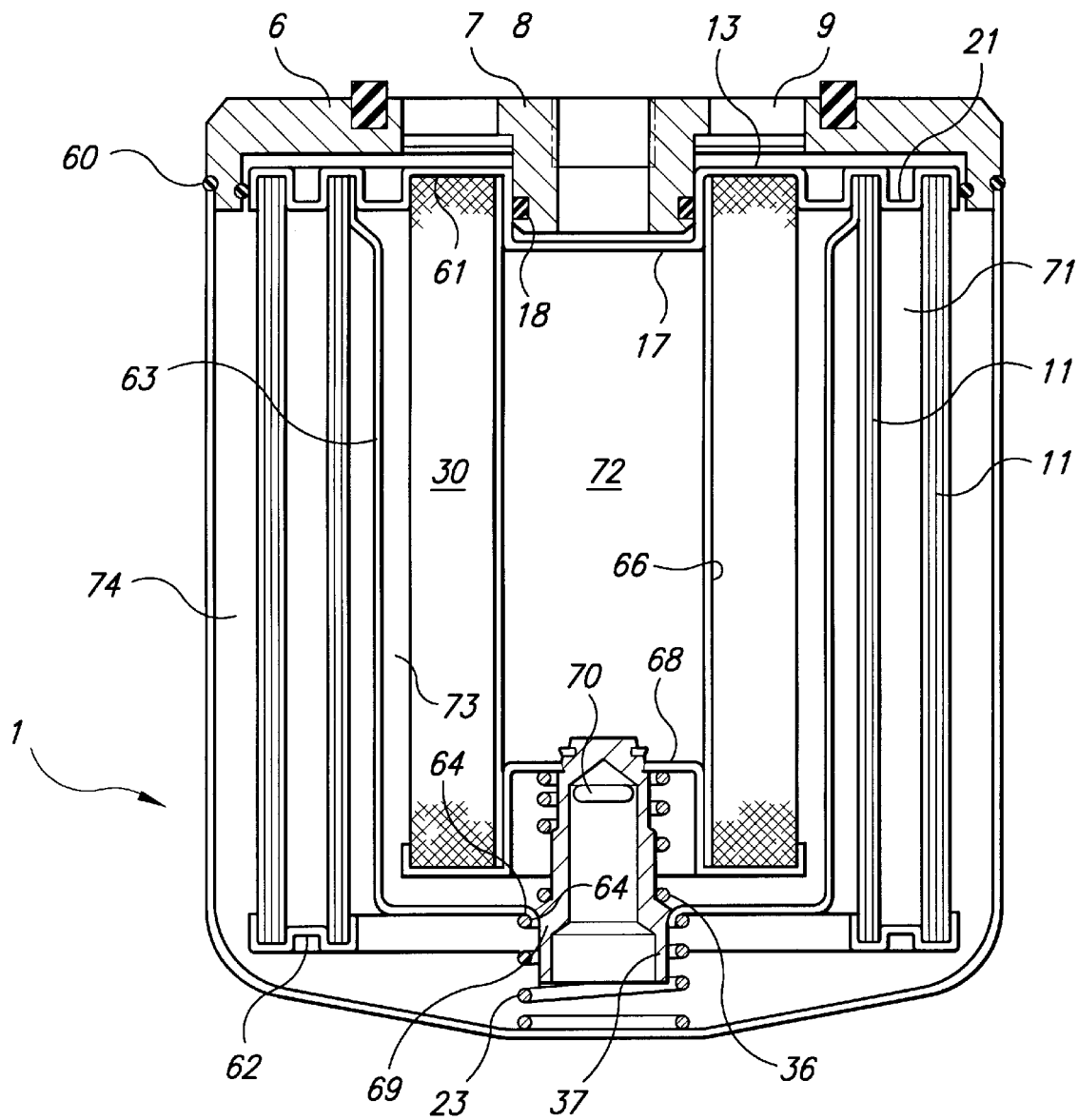
Figure 4A:
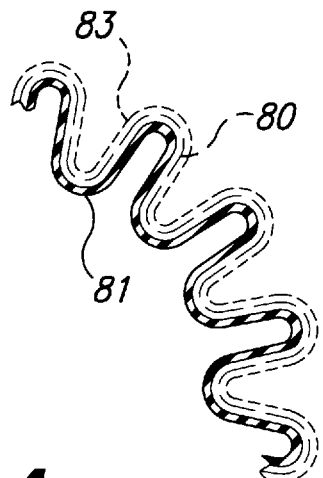
Figure 4B:
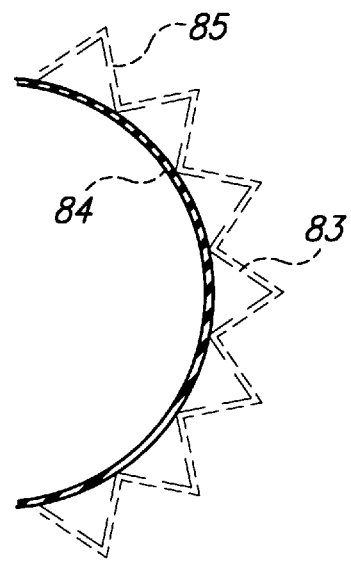

In order that the invention be better understood preferred embodiments will now be described by way of example with reference to the accompanying drawings in which FIG. 1 is a cross-sectional side view of a filter assembly according to the invention, FIG. 2 is a cross-sectional side view of another filter assembly according to the invention, FIG. 3 is cross-sectional side view of a further filter assembly according to the invention, FIG. 4a is a partial transverse sectional view of a particularly preferred screen construction and FIG. 4b is a similar view of a prior art screen construction.

Referring firstly to FIG. 1, a generally cylindrical casing 1 is in two parts, 2 and 3 respectively. These are assembled together to form a unitary closed casing with a mutually overlapping central region 4 containing an 'O'-ring seal 5. Casing portion 2 has an essentially flat base 6 provided with a central internally screw-threaded boss 7, defining a central opening which constitutes a fluid outlet 8. The base area surrounding the boss 7 contains a plurality of fluid inlets 9, two only of which are shown. Radially outwards of the inlet 9 there is a circular (as it would be seen in plan) land provided with an annular recess containing an 'O'-ring seal 15. The arrangement is such that screwing the filter assembly onto a support (not shown) which may be part of or connected to an internal combustion engine, the central boss 7 and the seal 15 co-operate with the support to define an essentially leakage free connection in which the outlet 8 and inlets 9 are isolated from each other and from the surrounding environment.

The inlets 9 communicate with an annular chamber 10 surrounding a cylindrical, large pore size screen 11. The screen 11 is in this example constituted by a wire-mesh sieve supported by a perforated metal tube 12. The opposite ends of the screen and tube 12 abut against a pair of metal end plates 13, 14. The end plate 13 includes a central aperture 17 which has an inwardly directed flange 18. The latter seats around an inwardly directed extension 19 of the boss 7, an 'O'-ring oil seal being provided on this extension 19 to ensure minimal leakage. A peripheral flange 20 and an intermediate annular rim 21 complete the end plate 13, which is identical to end plate 14 except in that the latter has no central aperture. Instead, there is a central recess 22 in which is seated a coil spring 23. The opposite end of the spring 23 seats on ribs 24 (one only of which is seen) on the inside of casing part 3. The spring 23 serves to bias the entire filter assembly (the internal components) towards the base 6.

Radially internally of the perforated metal tube 12 there is a small pore size screen 30 of a fine wire mesh material supported by a further perforated metal tube 31. The screen 30 and the tube 31 abut against an end plate 13 at one end and abut against an end cap 32 at the other end. The and cap 32 has fixed to it a tubular insert 33, which extends a short distance into the perforated metal tube 31. An aperture 34 is defined in the central region of the end cap 32 and there is a corresponding aperture 35 in the base of the insert 33. Trapped inside the latter, between the rim of the aperture 34 and the rim of the aperture 35, there is a coil spring 36 and a valve member 37 in the form of a flat disk with a rubber seal laminated to it. The seal seats against the rim of aperture 34 under the influence of the spring 36, so that in normal circumstances the aperture 34 is closed. Fluid passing through the large pore size screen 11 can therefore only reach the outlet 8 from annular space 38 by passing through the small pore size screen 30 and its supporting perforated metal tube 31. In the event that this screen 30 becomes occluded by fine debris, the back pressure developed (relative to the pressure at the outlet 8) across it will increase, to the point where the fluid pressure in annular space 38 is sufficient to overcome the spring 36, thereby displacing valve member 37 from its seated, sealing position against the rim of the aperture 34. Fluid can then by-pass the screen 30 through apertures 34 and 35, flowing directly from the annular space 38 to the outlet port 8.

When the valve member 37 unseats, even briefly, there is a risk of fine debris on the small pore size screen 30 being entrained by the diverted flow and carried through apertures 34 and 35 into the outlet 8, thereby negating the object of the filter assembly. To address this possibility, the small pore size screen 30 is partly enclosed by an impermeable tubular sleeve 39, one end of which is affixed to the end cap 32. The opposite end of the sleeve 39 stops short of the end plate 2, leaving a circumferentially extending gap 40 through which fluid entering into the annular space 38 through the coarse pore size screen 11, can gain access to the screen 30, which as previously mentioned is in this case a very fine wire mesh sieve.

Turning now to FIG. 2, most of the component parts are directly equivalent to those of FIG. 1 and bear the same reference numerals for convenience. However, there are fundamental differences in operation, the most important of which are that the locations of the small pore size screen 30 and the large pore size screen 11 are reversed, the latter being now located outside the former.

As a consequence of this, there is no need for the spring 23, the and of the small pore size screen 30 and supporting perforated metal tube 31 being located/retained by direct engagement with the ribs 24 in the closed end of the casing part 3.

The valve member 37 and the spring 36 are relocated to the inside of an axially extending boss 42 formed in the end plate 14 and defining the aperture 34 which the valve member 37 serves to close. A dished plate 43 is attached to the opposite face of the end plate 14 to provide support for the spring 36 as well as defining the aperture 35 which allows fluid to escape into the annular space 38. A further fundamental point of distinction over FIG. 1 is the provision of a tubular sleeve 50 of a heat shrinkable plastics material. This sleeve is initially located radially outwardly of the small pore size screen 30, so as to define a space 51 between it and the screen.

In use, the basic operation of the filter assembly of FIG. 2 is very much as before, even allowing for the fact that the two screens are differently located. Thus fluid enters through the inlet ports 9, enters the space 51 between the sleeve 50 and the small pore size screen 30 before passing through the latter into the space 38. It thereafter flows through the large pore size screen 11 before escaping through the outlet 8. In the event that the small pore size screen 30 becomes occluded, the back pressure (relative to that in the space 38, which will normally be much the same as at the outlet port 8) across it will overcome the spring 36, allowing the valve member 37 to lift off its seat. Fluid will then by-pass the small pore size screen 30 through the apertures 34, 35.

There would ordinarily be some risk of fine debris being re-entrained by the by-pass flow. To prevent this, in the particular case of the lubricating oil of a new engine where substantial amounts of fine debris might be expected, the material of sleeve 50 is selected to that after a relatively short warm-up period, the sleeve 50 will shrink down onto the small pore size filter 30, trapping substantially all of the fine debris collected therein. The filter assembly will thereafter operate in a conventional single screen mode using the by-pass valve 37 and the large pore size screen only.

Turning now to FIG. 3, most of the component parts are directly equivalent in function to those of FIGS. 1 and 2, and accordingly the same reference numerals have been employed. However, there are a number of important differences, which will now be described in detail.

In this particular embodiment, the casing 1 takes the form of a cup-shaped member whose open end is closed by the filter base 6 which is welded to the casing around a circumferential seam 60. Inside the casing there is provided a pair of concentric, spaced-apart relatively large pore size wire mesh screens 11, which extend between and plates 61 and 62 respectively. The and plate 61 also supports one end of a relatively small pore size mesh screen 30 and is apertured (21) in the flat annulus between the two large pore size screens 11. The end plate 62 simply closes off the space between the screens 11 so that fluid entering via inlet ports 9 through the apertures 21 can only escape either radially inwardly or radially outwardly through the large pore size screens.

Inside the two coarse screens 11 is a solid metal support tube 63 which is fixed at one end to the end plate 61. This tube 63 serves as an internal canister separating the small and large pore size screens. The opposite end terminates in an annular rim 64 which serves to receive and locate one end of a coil spring 23 which extends from the base of the casing towards the support tube 63, biassing the latter towards the base 6. The annular rim 64 also serves to locate a moulded plastics valve member 37. The end plate 61 also carries a relatively fine pore size filter 30 in the form of a pleated wire mesh reinforced by an inner perforated metal tube 66. This tube 66 is attached to an annular closure plate 67 which has a central rim 68 serving to define a central aperture and which is closed by the valve 37 member. A coil spring 36 extends between the rim 68 and a shoulder 69 on the body of valve member 37, so that the latter is biassed so as to close the central aperture. The valve member 37 is hollow and open at the end nearest to the casing. Several slots 70 (one only is shown) are provided in the wall of the valve member 37. In the closed position shown, fluid from the volume 74 can flow into the volume 73 through the slots 70. It then passes through the small pore size screen 30 into volume 72 and to the outlet 8. But on displacement of the valve member 37 in the direction of the base 6, there will be direct fluid communication between the volume 74 and the volume 72.

As a result, fluid entering via the inlet ports 9 flows into the tubular space 71 between the two relatively large pore size wire mesh screens 11. It then flows radially either inwardly or outwardly into the major volume 74 of the casing. Under normal circumstances it then passes through the slots 70 into the volume 73 surrounding the small pore size screen 30. It flows through the latter into the central region 72 and then out through the outlet, 8. But if the screen 30 becomes occluded to the point where the back pressure in casing volume 74 is sufficient to overcome the force exerted by the spring 36, then the valve member 37 will be displaced to allow flow directly from the volume 74 to the outlet 8, through the slots 70, by-passing the small pore size screen 30. Similarly in the event of a sudden pressure surge, the valve member 37 will lift off its seat to allow pressure relief by temporarily by-passing the fine screen 30. Of course, if the small pore size screen is occluded by filtered debris, the valve 37 may operate all the time there is fluid flow through the assembly. However, even under such a full by-pass condition, fluid must always pass through one of the screens 11, so that a degree of filtration will always be present.

Although the use of a by-pass valve to relieve pressure surges and to provide for total occlusion of the fine mesh filter is known, pressure surges can have serious consequences, because the by-pass valve does not operate instantaneously. The large pore size screen which is usually of a pleated construction, is especially vulnerable to buckling because if this occurs, unfiltered fluid will completely by-pass the filter, or more seriously, the buckled screen may completely obstruct the fluid flow.

It is particularly preferred that the full-flow filter assembly of the present invention is used in conjunction with a centrifugal cleaner, as a part of a complete fluid cleaning system. In a typical automotive application, all of the engine lubricating oil would pass through the full-flow filter assembly and a proportion of the flow would also pass through the centrifugal cleaner. The combination of a full-flow cleaner according to the present invention and a centrifugal cleaner is especially advantageous in protecting an engine over a prolonged period.

According to another particularly preferred embodiment of this invention, the large pore size screen is of a pleated construction and is provided with a perforated metal support which is itself pleated, the pleats extending axially of the screen so as to provide a series of generally radially directed ribs. Advantageously the large pore size screen and the perforated metal support are pleated together, for improved strength and integrity under pressure surges.

The same construction may be applied to the small pore size screen, but there is no major advantage in doing so.

This is illustrated diagrammatically in FIG. 4a of the accompanying Figures in which a transverse sectional view of a modified large pore size screen is shown.

Thus in FIG. 4a a coarse wire mesh 80 is pleated onto a pleated perforated metal core sheet 81 to form a unitary structure of improved resistance to buckling. By contrast, FIG. 4b illustrates a conventional pleated structure in which the supporting perforated tube 84 is not pleated and the pleated wire mesh 85 is only partially reinforced by the tube 84. For the sake of completeness it is noted that in both FIGS. 4a and 4b, an outer wire mesh reinforced layer 83 is used to cover the exposed surface of the mesh screens 80 and 85. Both the size of the perforations in the support tubes 81 and 84 and the pore size in the reinforcement layer 83 are sufficiently large as to have no effect on the filtration performance.

It will be appreciated that in FIG. 3, operation of the valve 37 to by-pass the fine mesh screen 30 carries with it a minimal risk of re-entrainment of debris from the fine mesh screen. The use of the two coarse screens 11 plus the presence of the solid support tube 63 ensures that there is minimal flow in the immediate vicinity of the small pore size screen when the valve 37 is open to by-pass the latter screen, Any loose debris will be trapped inside the support 63.

I claim:

1. A full-flow fluid filter assembly including a first large pore size screen and a small pore size screen which in use are disposed in series in a fluid flow path, together with means responsive to obstruction of the small pore size screen to cause substantially all of the fluid to pass only through the large pore size screen and further including means operable to minimize re-entrainment of any debris on or in the small pore size screen in the form of a shield constituted by a tubular member extending over part of the surface of the small pore size screen.

2. A full-flow filter assembly according to claim 1 wherein the shield is made at least in part of a thermally responsive material which, on heating, will shrink to trap any debris retained on the small pore size screen.

3. A full-flow filter assembly according to claim 1 wherein said means responsive to obstruction of the small pore size screen comprises a one-way valve.

4. A full-flow filter assembly according to claim 1 comprising a single housing with said screens disposed coaxially with respect to one another and including inlet and outlet ports for connection into the fluid flow path.

5. A full-flow filter assembly according to claim 4 wherein said inlet and outlet ports are located closely adjacent one another at one end of said housing.

6. A full-flow filter assembly according to claim 5 wherein at least one of said outlet ports and inlet ports incorporates means for attaching said filter assembly to support means for the assembly.

7. A full-flow filter assembly according to claim 1 wherein the first large pore size screen is paired with another large pore size screen, in concentric relation, separated by an annular space, and wherein said annular space is adapted to receive fluid to be filtered.

8. A full-flow filter assembly according to claim 7 wherein said another large pore size screen is constituted by a tubular pleated wire mesh filter supported by a correspondingly pleated perforated metal sheet, wherein pleats of said wire mesh filter and said perforated metal sheet extend axially of the first large pore size screen.

\* \* \* \* \*